(12) United States Patent
Kurokawa

(10) Patent No.: US 9,121,443 B2
(45) Date of Patent: Sep. 1, 2015

(54) ANGULAR BALL BEARING

(75) Inventor: Takanori Kurokawa, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 13/876,048

(22) PCT Filed: May 29, 2012

(86) PCT No.: PCT/JP2012/063813
§ 371 (c)(1),
(2), (4) Date: Mar. 26, 2013

(87) PCT Pub. No.: WO2013/128662
PCT Pub. Date: Sep. 6, 2013

(65) Prior Publication Data
US 2014/0219599 A1    Aug. 7, 2014

(30) Foreign Application Priority Data
Mar. 1, 2012  (JP) ................ 2012-045626

(51) Int. Cl.
*F16C 41/04* (2006.01)
*F16C 19/16* (2006.01)
*F16C 33/58* (2006.01)

(52) U.S. Cl.
CPC ............. *F16C 19/163* (2013.01); *F16C 33/585* (2013.01); *F16C 33/586* (2013.01); *F16C 41/04* (2013.01)

(58) Field of Classification Search
CPC ................................ F16C 33/58; F16C 33/583
USPC ........................... 384/513, 515, 516
See application file for complete search history.

(56) References Cited

U.S. PATENT DOCUMENTS 2,033,771 A * 3/1936 Leister et al. ................. 384/515
2,866,672 A * 12/1958 Black ........................... 384/515
3,230,022 A * 1/1966 Znamirowski ............... 384/515
(Continued)

FOREIGN PATENT DOCUMENTS

CN        2120214 U    10/1992
CN      101245805 A     8/2008
(Continued)

OTHER PUBLICATIONS

International Search Report dated Jul. 24, 2012 from the International Searching Authority in counterpart application No. PCT/JP2012/063813.
(Continued)

*Primary Examiner* — Thomas R. Hannon
(74) *Attorney, Agent, or Firm* — Sughrue Mion, PLLC

(57) ABSTRACT

An angular ball bearing includes an outer ring having a raceway surface on the inner circumferential surface thereof, a shoulder portion on one side of the raceway surface and a counter bore on the other side thereof; an inner ring having a raceway surface on the outer circumferential surface thereof, a shoulder portion on the other side of the raceway surface and a counter bore on one side thereof; and a plurality of balls provided between the raceway surfaces of the outer ring and the inner ring so as to be rotatable at a contact angle. The outer diameter dimension of the shoulder portion of the inner ring is larger than the inner diameter dimension of the shoulder portion of the outer ring, and the shoulder portion of the outer ring and the shoulder portion of the inner ring are overlapped with each other when viewed in the axial direction.

5 Claims, 6 Drawing Sheets

(56) References Cited

U.S. PATENT DOCUMENTS

| | | | |
|---|---|---|---|
| 3,880,481 A * | 4/1975 | George | 384/513 |
| 7,422,372 B2 * | 9/2008 | Yamaguchi et al. | 384/484 |
| 2009/0034895 A1 * | 2/2009 | Zlipko et al. | 384/513 |

FOREIGN PATENT DOCUMENTS

| | | |
|---|---|---|
| CN | 101403412 A | 4/2009 |
| CN | 102171469 A | 8/2011 |
| JP | 5212085 A | 1/1977 |
| JP | 979763 A | 3/1997 |
| JP | 200561431 A | 3/2005 |
| JP | 200644375 A | 2/2006 |
| JP | 2006316865 A | 11/2006 |
| JP | 200839069 A | 2/2008 |
| JP | 2008546973 A | 12/2008 |
| JP | 200979680 A | 4/2009 |
| JP | 2010230081 A | 10/2010 |

OTHER PUBLICATIONS

Written Opinion dated Jul. 24, 2012 from the International Searching Authority in counterpart application No. PCT/JP2012/063813.
Communication dated Feb. 28, 2015 issued by The State Intellectual Property of the People's Republic of China in counterpart Chinese Application No. 201280000454.8.

* cited by examiner

ANGULAR BALL BEARING

TECHNICAL FIELD

The present invention relates to an angular ball bearing, and more particularly, to an angular ball bearing having high load capacity and suitably used to support the rotating shafts of various heavy mechanical apparatuses.

BACKGROUND ART

A conventional angular ball bearing is equipped with an outer ring, on the inner circumferential surface of which a raceway surface is provided; an inner ring, on the outer circumferential surface of which a raceway surface is provided; and a plurality of balls provided between the raceway surfaces so as to be rotatable at a contact angle. This kind of bearing is built in various heavy mechanical apparatuses, such as speed reducers for industrial robots and construction machines.

In recent years, as these heavy mechanical apparatuses have been made smaller in size and lighter in weight, this kind of bearing has also been required not only to be made lower in cost but also to be made lighter in weight. For the purpose of cost reduction and weight reduction, as in the case of an angular ball bearing 30 shown in FIG. 5, the axial dimensions of the outer ring 31 and the inner ring 32 thereof have been made smaller.

In this angular ball bearing 30, the axial dimensions of the outer ring 31 and the inner ring 32 are made smaller, a counter bore 31b is formed on one side of the raceway surface 31a of the outer ring 31, and a counter bore 32b is formed on the other side of the raceway surface 32a of the inner ring 32; furthermore, since the axial dimensions of the outer ring 31 and the inner ring 32 are made small, a portion of each ball 33 protrudes from the axial end face of the outer ring 31 or the inner ring 32.

When this kind of bearing is produced, in particular, in an assembly process or a conveying process, the plurality of angular ball bearings 30 having been assembled are stacked in the axial direction, whereby, as shown in FIG. 6, the above-mentioned protruding portion of the ball 33 of one bearing makes contact with the outer ring 31 or the inner ring 32 of the bearing that is stacked thereon, and the surface of the ball 33 is likely to be damaged.

Hence, for the purpose of preventing the ball 33 from being damaged, as a conventional angular ball bearing, an angular ball bearing is known (for example, refer to Patent Document 1) that is characterized in that the bearings are stacked by using the retainers thereof for support purposes during storage and conveying.

PRIOR ART DOCUMENT

Patent Document

Patent Document 1: JP-A-2008-39069

SUMMARY OF THE INVENTION

Problem that the Invention is to Solve

However, in the angular ball bearing described in the above-mentioned Patent Document 1, since the stacked angular ball bearings are supported by the retainers, a large load is exerted to the retainers; this is undesirable in consideration of the strength of the retainers. Furthermore, since the angular ball bearing described in the above-mentioned Patent Document 1 is configured on the assumption that the bearings are stacked at the retainers, the degree of freedom in the design of the retainer is limited.

In consideration of the above-mentioned circumstances, an object of the present invention is to provide an angular ball bearing that can be stacked without damaging the balls thereof.

Means for Solving the Problems (1) An angular ball bearing comprising: an outer ring comprising: a raceway surface on the inner circumferential surface thereof; a shoulder portion on one side of the raceway surface; and a counter bore on the other side of the raceway surface; an inner ring comprising: a raceway surface on the outer circumferential surface thereof; a shoulder portion on one side of the raceway surface; and a counter bore on the other side of the raceway surface; a plurality of balls provided between the raceway surface of the outer ring and the raceway surface of the inner ring so as to be rotatable at a contact angle, wherein the outer diameter dimension of the shoulder portion of the inner ring is larger than the inner diameter dimension of the shoulder portion of the outer ring, and the shoulder portion of the outer ring and the shoulder portion of the inner ring are overlapped with each other when viewed in the axial direction.

(2) The angular ball bearing of the above item (1), wherein engagement portions are formed at the shoulder portion of the inner ring and at the shoulder portion of the outer ring, and wherein when the angular ball bearings are stacked on top of one another in the axial direction, the engagement portion formed at the shoulder portion of the inner ring of one of the angular ball bearings is engaged with the engagement portion formed at the shoulder portion of the outer ring of the other angular ball bearing.

(3) The angular ball bearing of the above item (1), wherein relief grooves are formed on the inner circumferential surface of the shoulder portion of the outer ring and on the outer circumferential surface of the shoulder portion of the inner ring.

Advantage of the Invention

According to the present invention, the outer diameter dimension of the shoulder portion of the inner ring is larger than the inner diameter dimension of the shoulder portion of the outer ring, and the shoulder portion of the outer ring and the shoulder portion of the inner ring are overlapped with each other as viewed in the axial direction, whereby when the angular ball bearings are stacked, interference is prevented between the balls of one bearing and the outer ring or the inner ring of the other bearing to be stacked thereon. Hence, the angular ball bearings can be stacked without using retainers and without damaging the balls.

EMBODIMENTS FOR CARRYING OUT THE INVENTION

Respective embodiments of an angular ball bearing according to the present invention will be now described in detail with reference to the drawings.

First Embodiment

First, a first embodiment of the angular ball bearing according to the present invention will be described referring to FIGS. 1 and 2.

Figure 1:
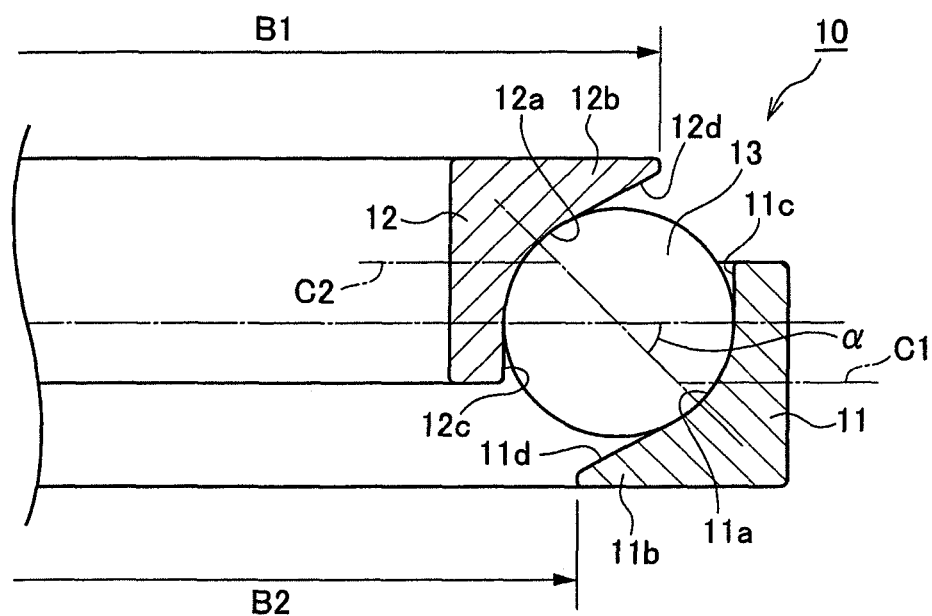
FIG. 1 is an enlarged sectional view showing the main sections of a first embodiment of an angular ball bearing according to the present invention.

An angular ball bearing 10 according to this embodiment is a thin angular ball bearing as shown in FIG. 1 and is equipped with an outer ring 11 having a raceway surface 11a on the inner circumferential surface thereof; an inner ring 12 having a raceway surface 12a on the outer circumferential surface thereof; and a plurality of balls 13 provided between the raceway surfaces 11a and 12a so as to be rotatable at a contact angle α. A shoulder portion 11b is formed on one side of the raceway surface 11a of the outer ring 11 in the axial direction, and a counter bore 11c is formed on the other side in the axial direction; furthermore, a shoulder portion 12b is formed on the other side of the raceway surface 12a of the inner ring 12 in the axial direction, and a counter bore 12c is formed on one side in the axial direction. The term "counter bore" means a shape having no shoulder portion on one of two sides in the axial direction. The outer ring 11, the inner ring 12 and the balls 13 are produced using steel such as high chromium carbide bearing steel, carburized bearing steel or stainless steel for rolling bearings.

Furthermore, the axial dimensions of the outer ring 11 and the inner ring 12 on the respective counter bore sides thereof are shortened, whereby the rings are assembled so that the center position C1 of the outer ring 11 in the axial direction and the center position C2 of the inner ring 12 in the axial direction are offset in the axial direction (so that the outer ring 11 is positioned lower in FIG. 1) and so that a portion of the outer ring 11 and a portion of the inner ring 12 are overlapped with each other as viewed in the radial direction.

Moreover, in this embodiment, the outer diameter dimension B1 of the shoulder portion 12b of the inner ring 12 is larger than the inner diameter dimension B2 of the shoulder portion 11b of the outer ring 11, and the shoulder portion 11b of the outer ring 11 and the shoulder portion 12b of the inner ring 12 are overlapped with each other as viewed in the axial direction. The overlapping amount is preferably 0 to 40% of the diameter of the ball 13, more preferably 5 to 35%.

What's more, relief grooves 11d and 12d are formed on the inner circumferential surface of the shoulder portion 11b of the outer ring 11 and on the outer circumferential surface of the shoulder portion 12b of the inner ring 12, respectively, so that the inner circumferential surface and the outer circumferential surface extend in the directions of the tangents to the ball 13 as viewed in cross section.

When the angular ball bearing 10 is viewed from the inside in the radial direction, a portion of the ball 13 protrudes from the end face of the inner ring 12 on the counter bore side thereof; and when the angular ball bearing 10 is viewed from the outside in the radial direction, a portion of the ball 13 protrudes from the end face of the outer ring 11 on the counter bore side thereof.

Figure 2:
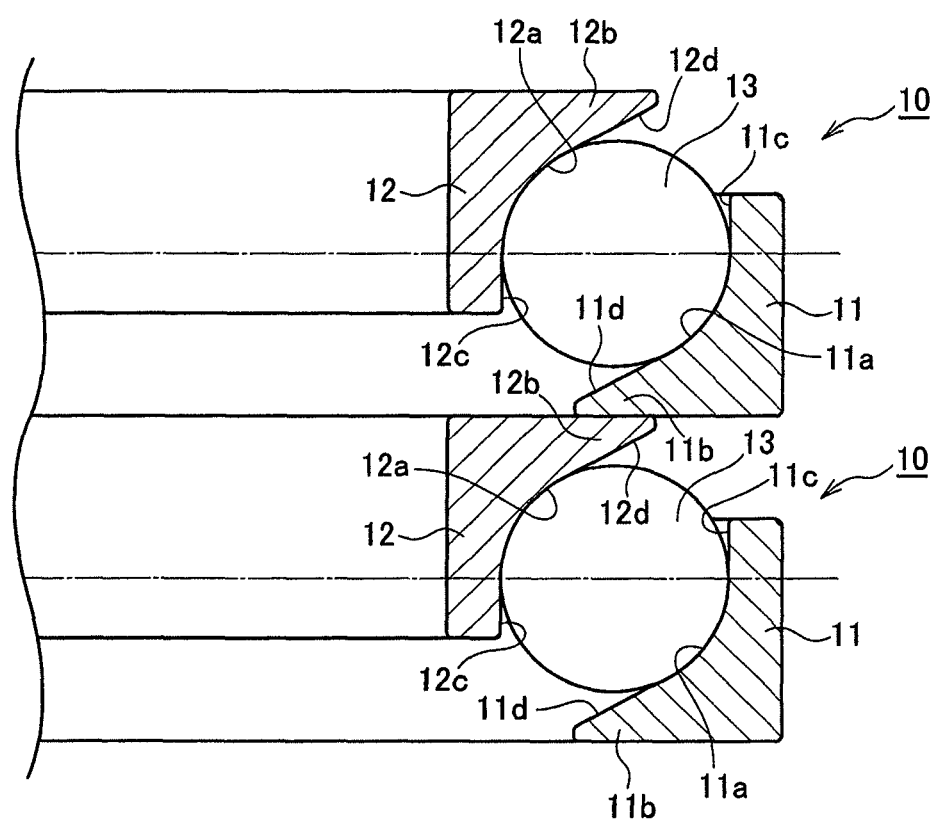
FIG. 2 is an enlarged sectional view showing the main sections of the angular ball bearings shown in FIG. 1 in a state of being stacked.

In the angular ball bearing 10 configured as described above, for example, in the case that the two angular ball bearings 10 are stacked, as shown in FIG. 2, the outer ring 11 of the angular ball bearing 10 on the upper side is placed on the inner ring 12 of the angular ball bearing 10 on the lower side, whereby the angular ball bearing 10 on the upper side is supported by the inner ring 12 of the angular ball bearing 10 on the lower side. Hence, the inner ring 12 of the angular ball bearing 10 on the lower side does not make contact with the balls 13 of the angular ball bearing 10 on the upper side, thereby preventing the balls 13 of the angular ball bearing 10 on the upper side from being damaged. Similarly, the outer ring 11 of the angular ball bearing 10 on the upper side does not make contact with the balls 13 of the angular ball bearing 10 on the lower side, thereby preventing the balls 13 of the angular ball bearing 10 on the lower side from being damaged.

As described above, in the angular ball bearing 10 according to this embodiment, the outer diameter dimension B1 of the shoulder portion 12b of the inner ring 12 is larger than the inner diameter dimension B2 of the shoulder portion 11b of the outer ring 11, and the shoulder portion 11b of the outer ring 11 and the shoulder portion 12b of the inner ring 12 are overlapped with each other as viewed in the axial direction, whereby when the angular ball bearings 10 are stacked, supporting is performed at the inner ring 12. For this reason, the angular ball bearings 10 can be stacked without damaging the balls 13.

Nothing has been mentioned in the above-mentioned embodiment about a retainer. Since the retainer is not used for the stacking of the angular ball bearings 10, the degree of freedom in the design of the retainer can be improved and any given retainer can be used.

Still further, since the relief grooves 11d and 12d are formed on the inner circumferential surface of the shoulder portion 11b of the outer ring 11 and on the outer circumferential surface of the shoulder portion 12b of the inner ring 12, the inner circumferential surface of the shoulder portion 11b of the outer ring 11 and the outer circumferential surface of the shoulder portion 12b of the inner ring 12 can be ground easily at the time of production.

Second Embodiment

Next, a second embodiment of the angular ball bearing according to the present invention will be described referring to FIGS. 3 and 4. Portions identical or equivalent to those of the above-mentioned first embodiment are designated by the identical or equivalent numerals and signs in the figures, and their descriptions are omitted or simplified.

Figure 3:
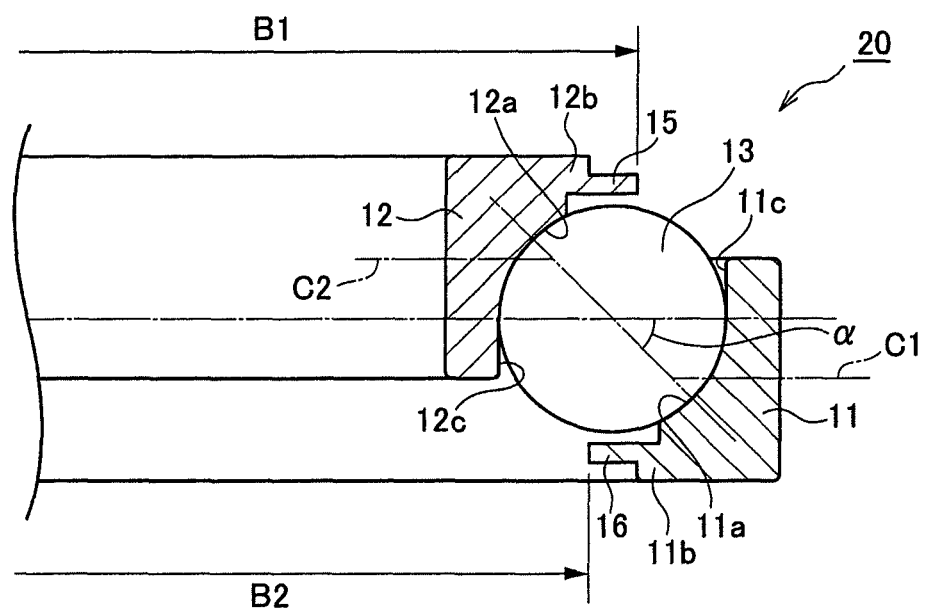
FIG. 3 is an enlarged sectional view showing the main sections of a second embodiment of the angular ball bearing according to the present invention.

Also in an angular ball bearing 20 according to this embodiment, as shown in FIG. 3, the outer diameter dimension B1 of the shoulder portion 12b of the inner ring 12 is larger than the inner diameter dimension B2 of the shoulder portion 11b of the outer ring 11, and the shoulder portion 11b of the outer ring 11 and the shoulder portion 12b of the inner ring 12 are overlapped with each other as viewed in the axial direction.

At the shoulder portion 11b of the outer ring 11, an engagement portion 16 is formed such that the outside end face in the axial direction is cut off by a predetermined width around the entire circumstance in the circumferential direction from the tip portion thereof, and also at the shoulder portion 12b of the inner ring 12, an engagement portion 15 is formed such that the outside end face in the axial direction is cut off by a predetermined width around the entire circumstance in the circumferential direction from the tip portion thereof. The engagement portions 15 and 16 are formed so as to have the same width in the radial direction and the same depth in the axial direction.

Figure 4:
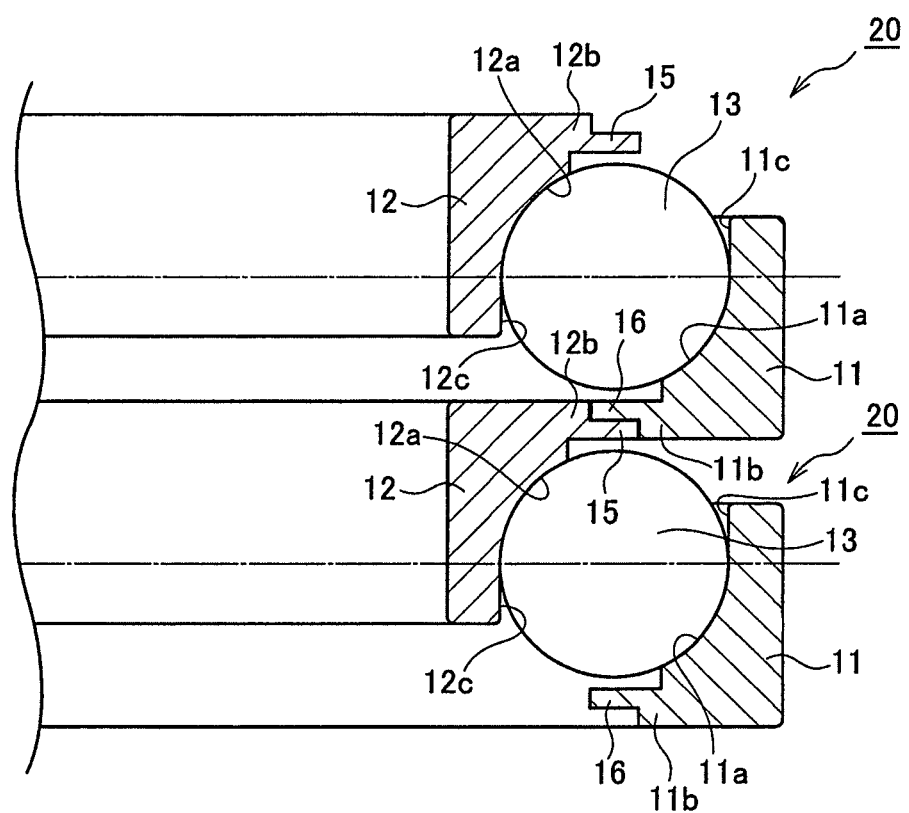
FIG. 4 is an enlarged sectional view showing the main sections of the angular ball bearings shown in FIG. 3 in a state of being stacked.
Figure 5:
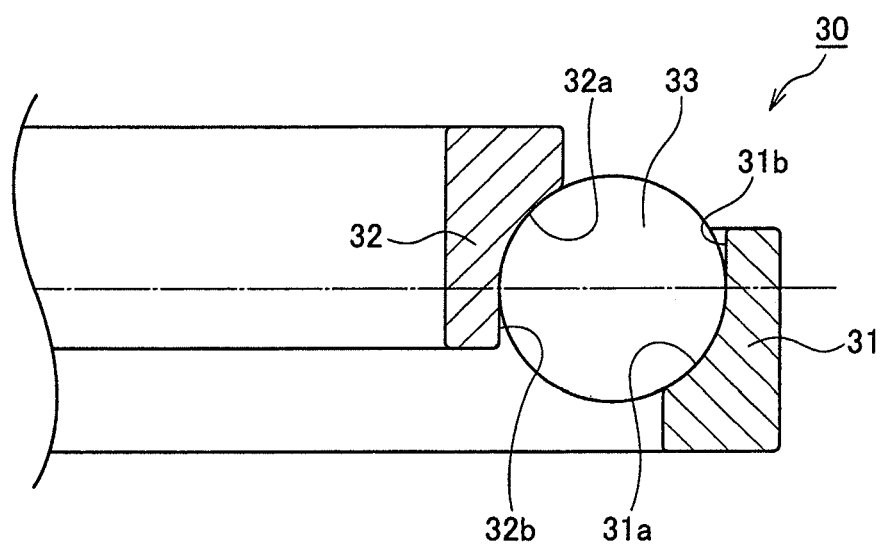
FIG. 5 is an enlarged sectional view showing the main sections of the conventional angular ball bearing.
Figure 6:
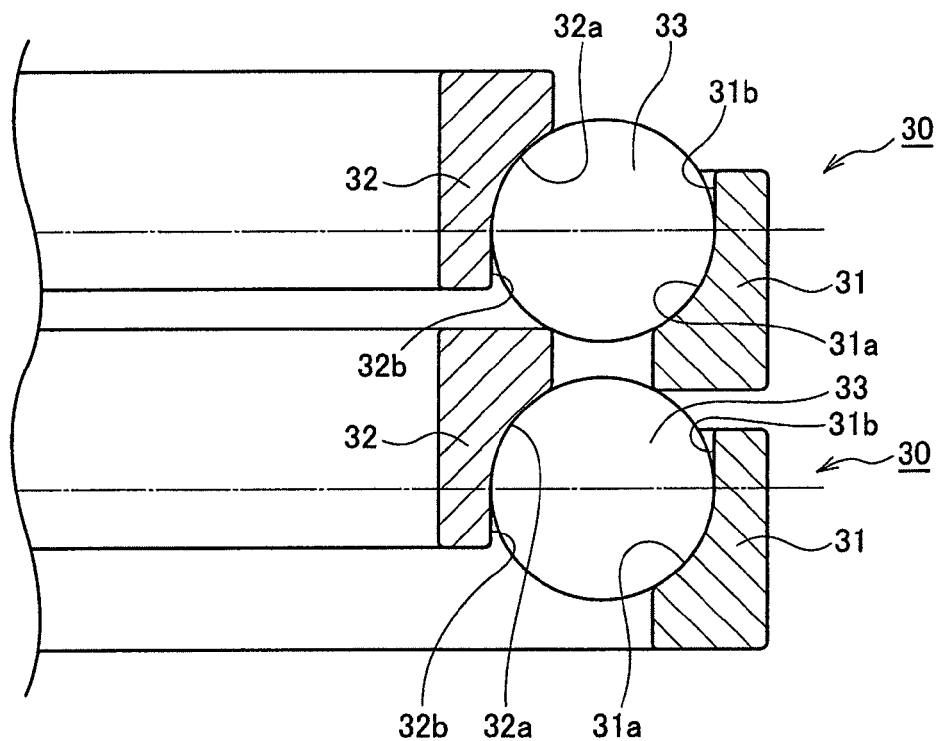
FIG. 6 is an enlarged sectional view showing the main sections of the angular ball bearings shown in FIG. 5 in a state of being stacked.

In the angular ball bearing 20 configured as described above, in the case that the two angular ball bearings 20 are stacked, as shown in FIG. 4, the outer ring 11 of the angular ball bearing 20 on the upper side is placed on the inner ring 12 of the angular ball bearing 20 on the lower side, whereby the angular ball bearing 20 on the upper side is supported by the inner ring 12 of the angular ball bearing 20 on the lower side. At this time, the engagement portion 16 formed at the shoulder portion 11b of the outer ring 11 of the angular ball bearing 20 on the upper side is engaged with the engagement portion 15 formed at the shoulder portion 12b of the inner ring 12 of the angular ball bearing 20 on the lower side.

Hence, the inner ring 12 of the angular ball bearing 20 on the lower side does not make contact with the balls 13 of the angular ball bearing 20 on the upper side, whereby the balls 13 of the angular ball bearing 20 on the upper side are not damaged. Similarly, the outer ring 11 of the angular ball bearing 20 on the upper side does not make contact with the balls 13 of the angular ball bearing 20 on the lower side, whereby the balls 13 of the angular ball bearing 20 on the lower side are not damaged. Moreover, since the engagement portions 15 and 16 are engaged with each other, the relative movement between the bearings is restricted, whereby the angular ball bearing 20 on the upper side is prevented from being displaced and dropping.

Although the shapes of the engagement portions 15 and 16 can be set as desired, it is preferable that when the bearings are stacked, the axially outside end face of the inner ring 12 of the angular ball bearing 20 on the lower side should be flush with the axially inside end face of the outer ring 11 of the angular ball bearing 20 on the upper side and the axially inside end face of the inner ring 12 of the angular ball bearing 20 on the lower side should be flush with the axially outside end face of the outer ring 11 of the angular ball bearing 20 on the upper side. With this configuration, the height of the stacked bearings can be reduced while avoiding contact with the balls 13.

Nothing has been mentioned either in this embodiment about a retainer. Since the retainer is not used for the stacking of the angular ball bearings 20, the degree of freedom in the design of the retainer can be improved and any given retainer can be used.

Also in this embodiment, relief grooves 11d and 12d may be formed on the inner circumferential surface of the shoulder portion 11b of the outer ring 11 in which the engagement portion 16 is formed and on the outer circumferential surface of the shoulder portion 12b of the inner ring 12 in which the engagement portion 15 is formed so that the inner circumferential surface and the outer circumferential surface extend in the directions of the tangents to the ball 13 as viewed in cross section.

The present invention is not limited to the bearings exemplified in the above-mentioned respective embodiments, but can be changed appropriately within a scope not departing from the gist of the present invention.

The present application is based on Japanese Patent Application (JP-A-2012-045626) filed on Mar. 1, 2012, the contents of which are incorporated herein by reference.

DESCRIPTION OF REFERENCE NUMERALS AND SIGNS 10, 20 angular ball bearing
11 outer ring
11a raceway surface
11b shoulder portion
11c counter bore
11d relief groove
12 inner ring
12a raceway surface
12b shoulder portion
12c counter bore
12d relief groove
13 ball
15 engagement portion
16 engagement portion
B1 outer diameter dimension of shoulder portion of inner ring
B2 inner diameter dimension of shoulder portion of outer ring
α contact angle

The invention claimed is:

1. An angular ball bearing comprising:
an outer ring comprising:
a raceway surface on the inner circumferential surface thereof;
a shoulder portion on one side of the raceway surface; and
a first counter bore on the other side of the raceway surface;
an inner ring comprising:
a raceway surface on the outer circumferential surface thereof;
a shoulder portion on one side of the raceway surface; and
a second counter bore on the other side of the raceway surface;
a plurality of balls provided between the raceway surface of the outer ring and the raceway surface of the inner ring so as to be rotatable at a contact angle,
wherein the outer diameter dimension of the shoulder portion of the inner ring is larger than the inner diameter dimension of the shoulder portion of the outer ring,
the shoulder portion of the outer ring and the shoulder portion of the inner ring are overlapped with each other when viewed in the axial direction,
the first counter bore having no shoulder portion on at least one side when viewed in the axial direction, and
wherein engagement portions are formed at the shoulder portion of the inner ring and at the shoulder portion of the outer ring such that the engagement portions each include a cut-out portion, and
wherein when the angular ball bearings are stacked on top of one another in the axial direction, the cut-out of the engagement portion formed at the shoulder portion of the inner ring of one of the angular ball bearings is engaged with the cut-out of the engagement portion formed at the shoulder portion of the outer ring of the other angular ball bearing.

2. The angular ball bearing of claim 1, wherein relief grooves are formed on the inner circumferential surface of the shoulder portion of the outer ring and on the outer circumferential surface of the shoulder portion of the inner ring.

3. The angular ball bearing of claim 1, wherein a portion of each of the plurality of balls protrudes from an end face of the inner ring on the counter bore side of the inner ring.

4. The angular ball bearing of claim 1, wherein a portion of each of the plurality of balls protrudes from an end face of the outer ring on a counter bore side of the outer ring.

5. The angular ball bearing of claim 1, wherein when the angular ball bearings are stacked on top of one another in the axial direction an upper portion of an axially outer end face of the inner ring is flush with a lower portion of an axially outer end face of the outer ring.

* * * * *